United States Patent Office 2,800,474
Patented July 23, 1957

2,800,474

9-(PIPERAZINOALKYL)NORHARMAN DERIVATIVES

Walter Voegtli, Evanston, Ill., assignor to G. D. Searle & Co., Chicago, Ill., a corporation of Delaware No Drawing. Application March 26, 1956, Serial No. 573,624

10 Claims. (Cl. 260—268)

The present invention relates to piperazinoalkyl substitution products of norharman and non-toxic salts thereof. It is particularly concerned with 9-(piperazinoalkyl)norharman derivatives which, in the forms of their free bases, can be represented by the structural formula

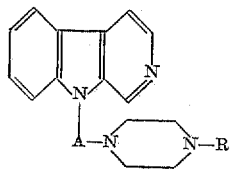

wherein A is a lower alkylene radical separating the groups attached thereto by at least two carbon atoms and R is hydrogen, a lower alkyl radical, or a hydroxy (lower alkyl) radical containing at least two carbon atoms.

In the foregoing structural formula the radical A can represent a polymethylene radical such as ethylene, trimethylene, tetramethylene, pentamethylene or hexamethylene. It can also represent one of the radicals isomeric therewith, such as propylene, butylene, amylene, hexylene or a branched-chain isomer thereof. The common feature of these radicals is that they interpose at least two carbon atoms between the groups to which they are attached. The term R can represent hydrogen, an alkyl radical containing fewer than nine carbon atoms, or a hydroxyalkyl radical containing at least two and fewer than nine carbon atoms. It can therefore represent such hydrocarbon radicals as methyl, ethyl, propyl, butyl, amyl, hexyl, heptyl, octyl and branched-chain isomers thereof, as well as such hydroxyalkyl radicals as hydroxyethyl, hydroxypropyl, hydroxybutyl and isomers and homologs thereof.

A method of manufacturing compounds of the present invention can be illustrated as follows. An alkali metal derivative of norharman is reacted with a suitable ester of a haloalkanol, and the condensation product is reacted with piperazine or a suitable derivative thereof. As a specific example, the lithium derivative of norharman, prepared by reaction of norharman with phenyllithium, is reacted with 3-chloropropyl p-toluenesulfonate, and the resulting 9-(3-chloropropyl)norharman of the structural formula

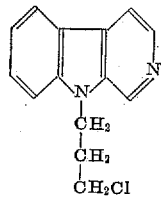

is reacted with piperazine to yield 9-(3-piperazinopropyl)-norharman.

Compounds of the general structural formula

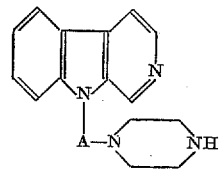

A being defined as hereinbefore, yield N-alkyl substitution products by treatment with an alkylating agent, such as an alkyl iodide in the presence of a basic condensing agent. The N-methyl substitution products can also be prepared under the specific conditions of methylation with a mixture of formic acid and formaldehyde. Hydroxy-alkylation is achieved by reaction of the 9-(piperazinoalkyl)norharman with a haloalkanol, representatively ethylene bromohydrin, 4-chloro-1-butanol or 6-bromo-1-hexanol, in the presence of a basic condensing agent.

There are modified procedures which also serve well for the manufacture of the compounds of this invention. For example, the lithium derivative of norharman can be reacted with an alkylpiperazinoalkyl halide, such as N-methyl - N' - (β - chloroethyl)piperazine, whereupon a claimed composition, 9-[2-(4-methylpiperazino)ethyl]-norharman results directly.

By suitable selection of the haloalkanol ester, the piperazine derivative, the alkylating agent, and the hydroxylating agent in the foregoing procedures, various isomers and homologs of the compounds particularly described herein can be conveniently obtained.

While, for uniformity, all of the compounds of this invention are described and named herein as derivatives of norharman, this parent ring system has been described under various names in the chemical literature, particularly as β-carboline, or, systematically, as 9-pyrid[3.4-b]-indole. It will be understood that these are exactly equivalent names for the parent tricyclic ring system.

Equivalent to the free bases of this invention for the purposes described herein are their non-toxic acid-addition salts. Such salts are formed by reaction of the appropriate free base with one of a variety of inorganic and strong organic acids, such as sulfuric, phosphoric, hydrochloric, hydrobromic, hydriodic, sulfamic, citric, lactic, maleic, malic, succinic, tartaric, cinnamic, acetic, benzoic, gluconic, ascorbic and related acids. The free bases also form quaternary ammonium salts with a variety of organic esters of sulfuric, hydrohalic and aromatic sulfonic acids.

The compounds of this invention have useful pharmacological properties. They are potent anti-hypertensive agents, and their administration causes a substantial fall in blood pressure of relatively long duration. These compounds are also depressants of the central nervous system and they produce a state of tranquility and ataraxia which is desirable in the treatment of conditions characterized by mental agitation. They are, additionally, effective anti-emetic agents.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.), pressures in millimeters (mm.) of mercury and quantities of materials in parts by weight.

*Example 1*

To a stirred suspension of 6.72 parts of norharman in 135 parts of anhydrous benzene there is added a freshly prepared solution of 3.7 parts of phenyllithium in about 42 parts of anhydrous ether. The reaction mixture is stirred for 2 hours, during which time a succession of color changes is observed. There is then added a solution of 10.2 parts of 3-chloropropyl p-toluenesulfonate in 35 parts of anhydrous benzene, and the mixture is stirred at about 25° C. for an additional 18 hours. The contents of the reaction vessel are partitioned into benzene and aqueous solutions by the addition of ice water and additional quantities of benzene. The benzene phase is washed with several portions of cold water and is then dried and concentrated under reduced pressure. A solution of the residue in butanone is mixed with a solution of 14 parts of piperazine in 80 parts of butanone, and the mixture is heated under reflux for 7 hours and then allowed to stand at about 25° C. for an additional 16 hours. The butanone is removed by distillation under reduced pressure. Ice and potassium carbonate solution are added, and the resulting mixture is extracted with chloroform. The chloroform solution is washed with water, dried and concentrated under reduced pressure. A solution of the residue in a small quantity of ethanol is diluted with several times its volume of ether and treated with carbon disulfide. The carbon disulfide-addition complex which precipitates is collected and heated with 10% hydrochloric acid until the evolution of carbon disulfide is over. The acidic solution is filtered, and the filtrate is stirred with solid potassium carbonate, with external cooling, until no more will dissolve. The precipitated oil is extracted with several portions of chloroform, and the combined chloroform extract is concentrated to dryness. The residue is subjected to purification by distillation in a short-path distillation apparatus. At a bath temperature of about 230–240° C. and a pressure of about 0.05 mm. there is obtained purified 9-(3-piperazinopropyl)norharman. This compuond has the structural formula

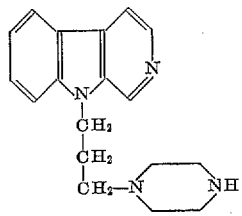

Example 2

A stirred suspension of 3.36 parts of norharman in 36 parts of anhydrous ether is treated by the addition of 1.85 parts of phenyllithium in about 22 parts of anhydrous ether, and the resulting reaction mixture is stirred in a nitrogen atmosphere for about 2 hours. During this period of time the mixture undergoes a series of color changes, and the norharman gradually goes into solution. There is then rapidly added, with external cooling if necessary, a solution of 5.10 parts of 3-chloropropyl p-toluenesulfonate in 15 parts of ether. The mixture is stirred for an additional 2 hours, during which time much insoluble material separates. The ethereal liquor is separated, and the residue in the reaction vessel is treated with portions of benzene and ice water until substantially all of the residue dissolves. The benzene and ether solutions are combined, washed with several portions of water, dried, and concentrated under reduced pressure. The dried residue thus obtained is dissolved in 20 parts of butanone and added to a solution of 7 parts of piperazine in 40 parts of butanone. This reaction mixture is heated under reflux for 6 hours, during which time a crystalline product separates. The solvent is removed by evaporation or distillation under reduced pressure, and the residue is partitioned between chloroform and cold aqueous potassium carbonate solution. The chloroform solution is washed with several portions of water and concentrated to dryness. The residue is distilled in a short-path distillation apparatus, and a solution of the distillate in a minimum quantity of ethanol is diluted with ether and treated with carbon disulfide, whereby there is precipitated a carbon disulfide-addition complex of the desired product. This precipitate is collected and washed with ethanol and with ether. It is then partitioned between 10% hydrochloric acid and ether, and the aqueous acidic phase is treated with potassium carbonate in order to precipitate the organic free base. This free base is extracted with several portions of chloroform, and the chloroform solution is dried and concentrated to a residual oil. The residual oil is distilled in a short-path distillation apparatus at a bath temperature of 210° C. and a pressure of about 0.02 mm.; and the distillate dissolved in a small quantity of ethanol is treated with an excess (more than 3 molecular equivalents) of hydrogen chloride in isopropyl alcohol. When crystallization of the precipitated salt is complete, it is collected on a filter and washed. In order to get an increased yield of this compound, it is desirable to dilute the mixture with ether prior to filtration. For purification, this crude salt is dissolved in methanol containing a small amount of water; a small amount of hydrogen chloride in isopropyl alcohol is added and the solution is filtered. The warm filtrate is gradually diluted with ether until crystallization begins. When separation of the crystalline product is complete, it is collected on a filter and washed with mixtures of methanol and ether and then with ether. There is thus obtained hygroscopic 9-(3-piperazinopropyl)norharman trihydrochloride. This compound melts with decomposition at about 278–280° C. in an evacuated tube.

Example 3

Twelve parts of 9-(3-piperazinopropyl)norharman is dissolved in 50 parts of warm formic acid; 43 parts of 36% aqueous formaldehyde is then added, and the reaction mixture is heated at about 90° C. for 2–3 hours. It is cooled and poured into ice water, and solid potassium carbonate is added until no more will dissolve. The mixture is then extracted with several portions of chloroform, and the dried chloroform solution is concentrated in a nitrogen atmosphere. The residue is distilled under reduced pressure, and a fraction amounting to about 10 parts is collected at a bath temperature of 240° C. and a pressure of about 0.06 mm. This compound is 9-[3-(4-methylpiperazino)propyl]norharman of the structural formula

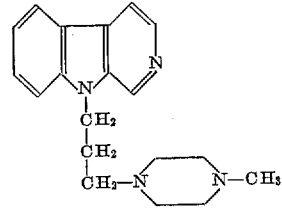

A solution of this free base in a minimum quantity of ethanol is treated with an excess of hydrogen chloride in isopropyl alcohol. Crystallization is induced, and the quantity of insoluble product is increased by dilution with ether. This product is collected on a filter and purified by recrystallization from a mixture of methanol and ether. This compound is 9-[3-(4-methylpiperazino)propyl]norharman trihydrochloride. It melts at about 271–272° C. and has hygroscopic properties.

Example 4

A mixture of 1.75 parts of 9-(3-piperazinopropyl)-norharman, 66 parts of anhydrous benzene, 0.9 part of potassium carbonate and 1.02 parts of ethyl iodide is heated under reflux for 5 hours. The reaction mixture is partitioned into benzene and aqueous solutions by the addition of water, and the benzene solution is dried and concentrated to a small volume. It is then diluted with ether and treated with carbon disulfide. A small amount of unreacted starting material is precipitated as the carbon disulfide-addition complex and is removed by filtration. The filtrate is concentrated and the residual oil is distilled in a short-path distillation apparatus. A fraction is collected at a bath temperature of about 245° C. and a pressure of about 0.1 mm. This compound is 9-[3-(4-ethylpiperazino)propyl]norharman of the structural formula

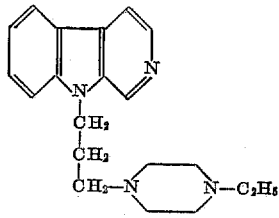

This free base is dissolved in a minimum quantity of ethanol and treated with an excess of hydrogen chloride in isopropyl alcohol. Crystallization is induced, and the mixture is diluted with ether in order to achieve maximum separation of product. This product is collected on a filter and purified by recrystallization from a mixture of methanol and ether. There is thus obtained hygroscopic 9-[3-(4-ethylpiperazino)propyl]norharman trihydrochloride melting with decomposition at about 277–278° C.

The corresponding trihydrobromide is prepared in an analogous manner by treatment of the free base with an excess of hydrogen bromide in isopropyl alcohol.

By the substitution of 1.1 parts of propyl iodide for the ethyl iodide in the foregoing procedures, there are obtained 9-[3-(4-propylpiperazino)propyl]norharman and its hydrohalide salts.

Example 5

A solution of 72 parts of N-methyl-N'-(β-hydroxyethyl)piperazine in a minimum quantity of ethanol is diluted with several times its volume of ether and treated with an excess of hydrogen chloride in isopropyl alcohol. The crystalline dihydrochloride which separates is collected on a filter and washed with ether. It is then suspended in 650 parts of thionyl chloride, and the mixture is heated under reflux for 24 hours. The thionyl chloride is then removed by distillation under reduced pressure, and the residue is suspended repeatedly in portions of benzene which are then removed by distillation under reduced pressure, in order to remove remaining traces of thionyl chloride. The residue is recrystallized from a mixture of methanol and ether to afford N-methyl-N'-(β-chloroethyl)-piperazine dihydrochloride melting with decomposition at about 300° C. In order to obtain the free base, this dihydrochloride is dissolved in a small quantity of water, and the solution is saturated with potassium carbonate. Cooling with an external ice bath is employed throughout this operation. The relatively insoluble free base is separated from the aqueous phase and is dried over potassium carbonate and then over potassium hydroxide. This compound is N-methyl-N'-(β-chloroethyl)piperazine.

Example 6

To a stirred suspension of 3.36 parts of norharman in 66 parts of anhydrous benzene there is added a freshly prepared solution of 1.85 parts of phenyllithium in 22 parts of anhydrous ether. The reaction mixture is stirred for 2 hours. There is then added 3.5 parts of N-methyl-N'-(β-chloroethyl)piperazine in 22 parts of anhydrous benzene, and the mixture is stirred at about 25° C. for 18 hours and finally heated under reflux for 4 hours. Ice is added, whereupon there occurs a precipitation of unreacted norharman. This is removed by filtration, and the benzene solution is separated from the filtrate, washed with additional portions of water and concentrated to dryness. The residue is subjected to a fractional distillation at a pressure of about 0.06 mm. An additional quantity of unreacted norharman is collected as a sublimate or distillate below 200° C. The reaction product is collected as an oil distilling at about 220–225° C. This compound is 9-[2-(4-methylpiperazino)ethyl]norharman of the structural formula

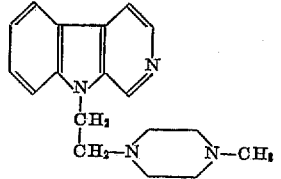

A portion of the free base dissolved in a minimum quantity of isopropyl alcohol is treated with an excess of hydrogen chloride in isopropyl alcohol, and the crystalline precipitate is collected on a filter. This compound is hygroscopic 9-[2-(4-methylpiperazino)ethyl]norharman trihydrochloride. It melts at about 260–265° C. with prior decomposition.

Example 7

A mixture of 5 parts of 9-(3-piperazinopropyl)norharman, 200 parts of anhydrous benzene, 2.6 parts of potassium carbonate and 2.3 parts of ethylene bromohydrin is heated under reflux for 8 hours. The inorganic material is dissolved with water, and the benzene solution is separated, concentrated to a small volume, diluted with ether and treated with carbon disulfide to precipitate a small amount of unreacted starting material as an addition-complex. This precipitated material is collected and discarded, and the filtrate is concentrated to dryness. The residual oil is purified by distillation in a short-path distillation apparatus at a pressure of about 0.02 mm.; the desired fraction is collected at a bath temperature beginning at about 240° C. This compound is 9-{3-[4-(β-hydroxyethyl)piperazino]propyl}norharman of the structural formula

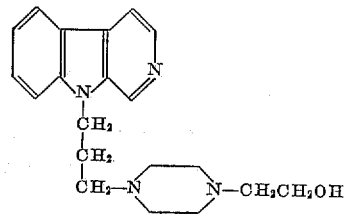

A citric acid salt is obtained by treating a solution of this free base in a minimum quantity of isopropyl alcohol with a hot solution of citric acid in isopropyl alcohol, allowing the reaction mixture to cool, and diluting it with ether.

Example 8

To a mixture of 105 parts of p-toluenesulfonyl chloride and 108 parts of 4-chloro-1-butanol maintained at about 10–15° C., there is added, with stirring, a solution of 32 parts of sodium hydroxide in 150 parts of water. Stirring is continued for 1 more hour, after which there is added 105 parts of p-toluenesulfonyl chloride followed by another solution of 32 parts of sodium hydroxide in 150 parts of water. After an additional three hours of continuous stirring, the reaction mixture is extracted with several portions of ether, and the combined ethereal solution is washed with water and with 20% aqueous sodium hydroxide solution. It is then dried and concentrated under reduced pressure, leaving a residue of 4-chlorobutyl p-toluenesulfonate. This compound can be purified by distillation under reduced pressure.

To a stirred suspension of 8 parts of norharman in 160 parts of anhydrous benzene there is added a freshly prepared solution of 4.4 parts of phenyllithium in about 120 parts of anhydrous ether. The reaction mixture is stirred for 2 hours at about 25° C., and there is then added a solution of 12.9 parts of 4-chlorobutyl p-toluenesulfonate in 50 parts of anhydrous benzene. The mixture is stirred at about 25° C. for an additional 24 hours, after which it is partitioned into benzene and aqueous solutions by the addition of ice water and additional quantities of benzene. The benzene phase is washed with several portions of cold water and is then dried and concentrated under reduced pressure. A solution of the residue in butanone is mixed with a solution of 16.7 parts of piperazine in 100 parts of butanone, and the mixture is heated under reflux for 8 hours and then allowed to stand at about 25° C. for an additional 20 hours. The butanone is removed by distillation under reduced pressure. Ice and potassium carbonate solution are added, and the resulting mixture is extracted with chloroform. The chloroform solution is washed with water, dired and concentrated under reduced pressure. A solution of the residue in the minimum quantity of ethanol is diluted with several times its volume of ether and treated with carbon disulfide. The carbon disulfide-addition complex which precipitates is collected and heated with 10% hydrochloric acid until the evolution of carbon disulfide is over. The acidic solution is filtered, and the filtrate is stirred with solid potassium carbonate, with external cooling, until no more will dissolve. The precipitated oil is extracted with several portions of chloroform, and the combined chloroform extract is concentrated to dryness. The residue is subjected to purification by distillation in a short-path distillation apparatus. A distillate of 9-(4-piperazinobutyl)norharman is obtained at a bath temperature of about 240° C. and a pressure of about 0.02 mm. This compound has the structural formula

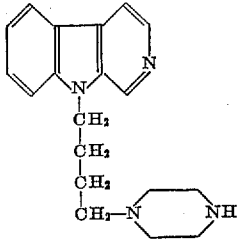

*Example 9*

A mixture of 4.2 parts of 9-(4-piperazinobutyl)norharman, 200 parts of anhydrous benzene, 2.1 parts of potassium carbonate and 1.6 parts of 4-chloro-1-butanol is heated under reflux for 18 hours. The inorganic material is removed by washing the reaction mixture with water. The benzene solution is then concentrated to a small volume, diluted with ether and treated with carbon disulfide to precipitate a small amount of unreacted starting material as an addition-complex. This precipitated addition-complex is collected and discarded, and the filtrate is concentrated to dryness. This compound is crude 9-{4-[4-(δ-hydroxybutyl)piperazino]butyl}norharman of the structural formula

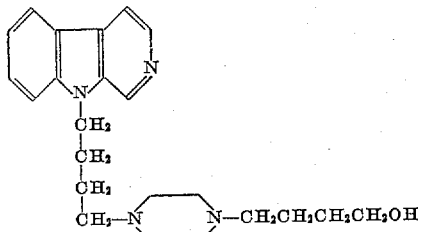

This compound is readily purified by converting it to an acid-addition salt. For this purpose a water-soluble trihydrochloride is obtained by treating a solution of the free base in a minimum quantity of ethanol with an excess of hydrogen chloride in isopropyl alcohol.

What is claimed is:

1. A member of the class consisting of bases and nontoxic acid-addition salts thereof, said bases having the structural formula

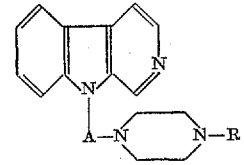

wherein A is a lower alkalene radical separating the groups attached thereto by at least two carbon atoms and R is a member of the class consisting of hydrogen, lower alkyl radicals, and hydroxy(lower alkyl) radicals containing at least two carbon atoms.

2. A compound of the structural formula

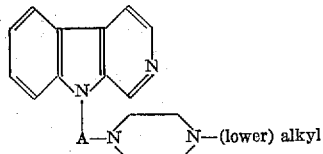

wherein A is a lower alkylene radical separating the groups attached thereto by at least two carbon atoms.

3. A compound of the structural formula

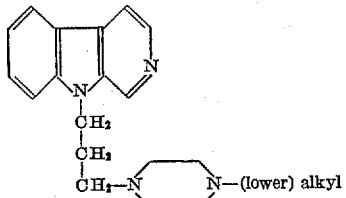

4. 9 - [3 - (4 - methylpiperazino)propyl]norharman.
5. 9 - [3 - (4 - ethylpiperazino)propyl]norharman.
6. A compound of the structural formula

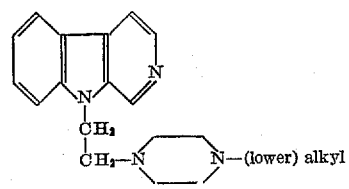

7. 9 - [2 - (4 - methylpiperazino)ethyl]norharman.
8. A compound of the structural formula

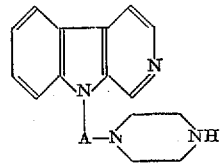

wherein A is a lower alkylene radical separating the groups attached thereto by at least two carbon atoms.

9. 9-(3-piperazinopropyl)norharman.
10. A compound of the structural formula

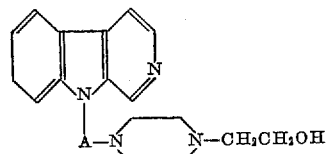

wherein A is a lower alkylene radical separating the groups attached thereto by at least two carbon atoms.

No references cited.

UNITED STATES PATENT OFFICE
Certificate of Correction

Patent No. 2,800,474                                                  July 23, 1957

Walter Voegtli

It is hereby certified that error appears in the printed specification of the above numbered patent requiring correction and that the said Letters Patent should read as corrected below.

Column 2, lines 29 and 30, for "hydroxylating" read —hydroxyalkylating—; column 6, line 18, for "bane" read —base—; column 8, line 14, claim 1, for "alkalene radical" read —alkylene radical—; lines 66 to 72 inclusive, claim 10, the formula should appear as shown below instead of as in the patent—

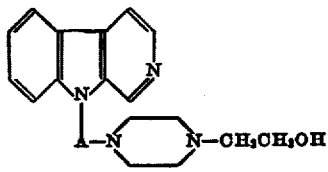

Signed and sealed this 15th day of October 1957.

[SEAL]

Attest:
KARL H. AXLINE,
*Attesting Officer.*

ROBERT C. WATSON,
*Commissioner of Patents.*